Nov. 21, 1939.   I. W. MEFFERD   2,181,062
INVISIBLE RIM SPECTACLES
Filed Sept. 2, 1938
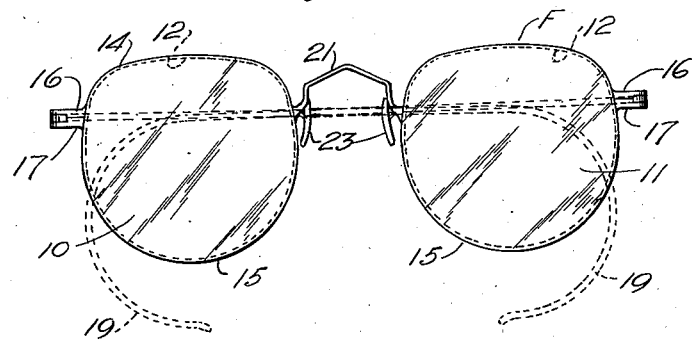
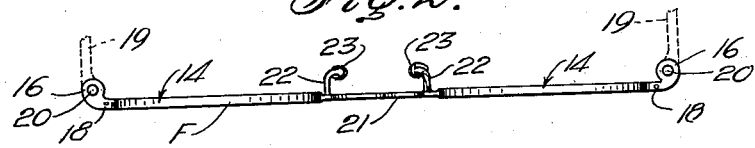
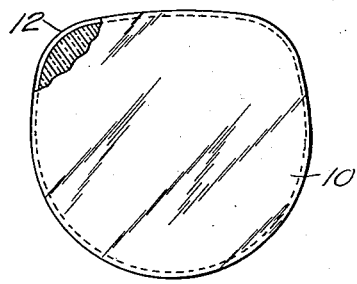 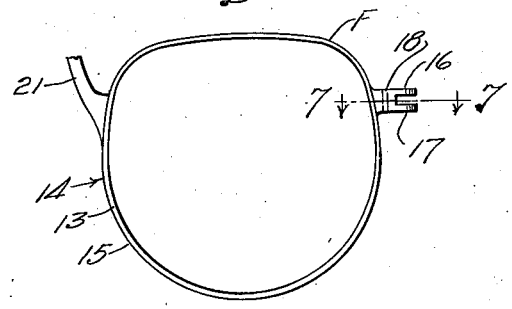
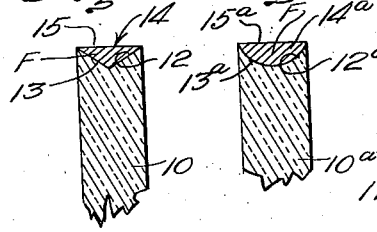 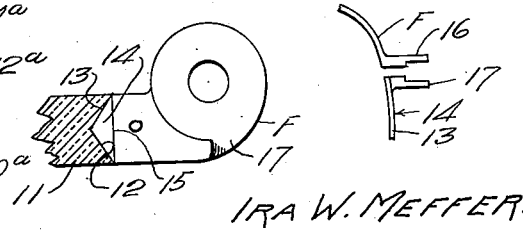
Inventor
IRA W. MEFFERD,
By Kimmel & Crowell
Attorneys.

Patented Nov. 21, 1939

2,181,062

UNITED STATES PATENT OFFICE 2,181,062

INVISIBLE RIM SPECTACLES

Ira W. Mefferd, Ainsworth, Nebr.

Application September 2, 1938, Serial No. 228,207

1 Claim. (Cl. 88—47)

This invention relates to spectacles and more particularly to a spectacle of the invisible rimmed type.

An object of this invention is to provide a rim structure for the lenses of a spectacle which is so constructed that the rim will give the same security to the glasses that an exposed rim now gives while at the same time providing an invisible rim having the necessary strength and security to the glasses that the exposed rim now provides.

Another object of this invention is to provide a rim structure which will protect the lenses against breakage so that the lenses will not have to be drilled for holes to receive the mounting device and so that any strain communicated to the rim or frame structure will not affect the lenses as is the case where the mounting devices are drilled through the lenses and shocks or strains are communicated to the lenses through the holes and clamping devices which causes the lenses to become broken or chipped.

A further object of this invention is to provide a rim structure for the lenses of a pair of spectacles which embodies a metal or like rim structure, and also providing a lens structure formed to receive the novel type of rim structure so that the rim will be substantially embedded in the marginal edge portions of the lenses and thus conceal the rim or frame structure so that the appearance of the spectacles from the front will be an absence of frame structure similar to that where the lenses are drilled to receive the temple joints and the nose piece holding device.

A still further object of this invention is to provide in combination an eye wire structure and a lens, wherein the eye wire may be provided with a suitable color similar to that of the lenses, particularly where the lens is other than clear glass so that the eye wire will harmonize with and be substantially invisible relative to the lens.

A further object of this invention is to provide a spectacle structure of this kind wherein the effect of a rimless lens structure is simulated, but at the same time the durability and strength of a frame structure is provided in such a manner that the ultimate cost of the spectacles is not unduly increased.

With the foregoing and other objects in view, the invention consists of the novel construction, combination and arrangement of parts as will be more specifically referred to and as are illustrated in the accompanying drawing wherein is shown an embodiment of the invention, but it is to be understood that changes, variations and modifications may be resorted to which fall within the scope of the invention as claimed.

In the drawing:

Figure 1 is a detail front elevation of a pair of spectacles constructed according to an embodiment of this invention, Figure 2 is a detail top plan of the spectacles, Figure 3 is a detail front elevation partly broken away and in section of one of the lenses, Figure 4 is a front elevation of an eye wire removed from the lens, Figure 5 is a fragmentary transverse sectional view through a lens and the rim, Figure 6 is a view similar to Figure 5 of a modified form of lens and rim structure, Figure 7 is a sectional view taken on the line 7—7 of Figure 4 but including a fragment of the enclosed lens, and Figure 8 is a fragmentary front elevation of the outer end portion of one of the rims showing the temple joint structure in open position.

Referring to the drawing, the numerals 10 and 11 designate a pair of lenses of suitable configuration and the character F designates generally a frame structure secured to the lenses 10 and 11.

Each of the lenses herein disclosed is provided in the outer edge thereof with a V-shaped groove 12 of suitable depth, and the outer edges of the groove 12 terminate at a point substantially coincident with the inner and outer faces of the lenses 10 and 11. A rim or eye wire member 14 is adapted to engage about the marginal edge portions of each lens 10 and 11, and this eye wire or rim member 14 is substantially triangular in transverse configuration with the inner faces 13 thereof disposed on an angle coincident with the angle of the opposite sides of the groove 12.

In the present instance this groove 12 is disclosed as a relatively shallow groove with the opposite sides thereof disposed on a substantially obtuse angle, the outer side or face 15 of the eye wire 14 being substantially coplanar or flush with the outer edges of the groove 12. Each eye wire 14 is split with the free ends thereof disposed outermost, and complementary temple joint members 16 and 17 are secured to the opposite ends of the eye wire 14, the joint members 16 and 17 being clamped together by means of a screw or bolt 18. A temple bar 19 is adapted to pivotally engage between the two joint members 16 and 17 being pivotally mounted on a pivot 20 which may be in the form of a screw or bolt or in the form of a trunnion which may be fast on the outer end portion of a temple 19.

A bridge 21 is disposed between the pair of eye wires 14 and the lenses 10 and 11, and this bridge 21 has the opposite ends thereof secured directly to the adjacent or inner portions of the eye wires 14 as by solder or the like. A nose pad arm 22 extends rearwardly of the lower ends of the bridge 21 being secured to the bridge 21 by means of solder or like fastening means. A nose pad 23 is secured to each arm 22 and the two nose pads 23 are disposed in confronting position and are disposed at a point above the center of each lens 10 and 11, although if desired, the nose pads 23 and the bridge 21 may be positioned at any desired or convenient location relative to the lenses 10 and 11.

In Figure 6 there is disclosed a modified form of lens and rim or eye wire structure wherein the lens 10a is provided in the outer edge thereof with a transversely curved channel or groove 12a. The eye wire 14a is rounded as at 13a on its inner side and is provided with a flat surface 15a. The outer edge portion of the groove 12a terminates closely adjacent the opposite faces of the lens 10a, although if desired, the outer edges of the groove 12a may terminate slightly inwardly of the outer face of the lens 10a so as to eliminate sharp edges and permit the glass forming the lens to be ground slightly in order to relieve the edges of the glass of any sharp corners which might injure the wearer or might cause chipping of the glass when the lens has been subjected to jars or been dropped.

A spectacle structure constructed according to this invention will provide a metal frame within which the lenses are received wherein the eye wires or body portions of the frame are substantially concealed or embedded in the marginal portions of the lenses. The eye wires 14 and 14a may be provided with any suitable color which may be similar to the color of the lenses where the lenses are colored, so that the eye wires 14 will be substantially invisible not only due to their color but also due to the fact that substantially all of the eye wire is embedded in the marginal portions of the lenses and from the front the spectacle gives the appearance of a rimless spectacle although the frame F will give the strength of a metal frame similar to the metal frames heretofore used which protruded from the marginal edge portions of the lenses.

The use of a frame and lens structure of this kind will make it unnecessary to provide holes in the lens to receive the temple bar joint members and the nose piece clamping members so that there will not be any localized strain on the lenses at the several joints and clamps. The strain on the bridge or nose piece and the joints will be communicated to the eye wires rather than directly to the lenses, and in this manner the lenses will not become chipped on account of undue strains. This spectacle structure will eliminate the unsightly clamping devices upon the lenses and will have an effect or appearance similar to a rimless mounting, but with the strength and durability of an old type rim mounting.

The temple bars and the joints therefor may be positioned at any desired point along the outer edge portions of the frame with respect to the center of each lens, and in the present instance these joint members 16 and 17 are positioned at a point above the center of each lens 10 and 11 so that the temple bars and the joint members 16 and 17 will not obstruct the clear view adjacent the outer edges of each lens.

Each lens as shown includes a side surface, a front surface and a rear surface. The front and rear surfaces each includes what may be termed a top terminus, a nasal side terminus, a temple side terminus and a bottom terminus. The termini of the front surface align with the termini of the rear surface. The side surface is in the form of an endless groove inset with respect to the termini of the front and side surfaces.

Each eye wire or rim, as shown, corresponds in length to the length of the groove in a lens and is of a cross-sectional contour corresponding to the cross-sectional contour of the groove. Each eye wire is mounted in, and completely fills a groove. In transverse cross-section, the eye wire has a squared outer surface which is flush with the termini of the front and rear surfaces of the lens and which makes the eye wire invisible when viewing the lens from the front thereof.

What I claim is:

In spectacles, eyeglasses and the like, in combination, a pair of lenses, a pair of eyewires, temple connections, and a bridge, said lenses each having front and rear faces, top and bottom, and nasal and temple sides, and their edges in the form of an endless groove, said groove extending from face to face of the lenses, said eyewires each having as end portions thereof, coacting parts forming temple connections outwardly projecting with respect to the temple sides of said lenses, said eyewires being complementary in cross-section to the grooves and except for said coacting parts being equal to and no greater in cross-sectional area than the area of said endless grooves, whereby to completely conceal the eyewires from view when the spectacles are being worn, except to observation directly from an edge of the lenses, and said eyewires being connected by said bridge.

IRA W. MEFFERD.